United States Patent
Yamato (10) Patent No.: US 11,993,379 B2
(45) Date of Patent: May 28, 2024

(54) UNMANNED AERIAL VEHICLE, AERIAL VEHICLE CONTROL SYSTEM AND TRANSPORTATION METHOD

(71) Applicant: Rakuten Group, Inc., Tokyo (JP)

(72) Inventor: Takumi Yamato, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 674 days.

(21) Appl. No.: 17/059,313

(22) PCT Filed: Apr. 26, 2019

(86) PCT No.: PCT/JP2019/018081
§ 371 (c)(1),
(2) Date: Nov. 27, 2020

(87) PCT Pub. No.: WO2020/217497
PCT Pub. Date: Oct. 29, 2020

(65) Prior Publication Data
US 2021/0179265 A1   Jun. 17, 2021

(51) Int. Cl.
*B64D 1/22*   (2006.01)
*B64U 50/19*   (2023.01)
(Continued)

(52) U.S. Cl.
CPC ............. *B64D 1/22* (2013.01); *B64U 50/19* (2023.01); *B64U 2101/60* (2023.01); *B66C 1/08* (2013.01)

(58) Field of Classification Search
CPC ... B64D 1/02; B64D 1/12; B64D 1/22; B64U 2101/60
See application file for complete search history.

(56) References Cited

U.S. PATENT DOCUMENTS 9,487,356 B1   11/2016   Aggarwal
9,688,404 B1   6/2017   Buchmueller et al.
(Continued)

FOREIGN PATENT DOCUMENTS

JP   2014-69971 A   4/2014
JP   2016-88675 A   5/2016
(Continued)

OTHER PUBLICATIONS

Japanese Notice of Decision to Grant a Patent for 2020-513368 dated, Aug. 11, 2020.
(Continued)

*Primary Examiner* — Joshua J Michener
*Assistant Examiner* — Arfan Y. Sinaki
(74) *Attorney, Agent, or Firm* — Sughrue Mion, PLLC (57) ABSTRACT

An unmanned aerial vehicle according to an embodiment of the present invention includes: an aerial vehicle body capable of flying; a winding member provided to the aerial vehicle body and capable of winding and unwinding a linear member; an attractive member provided to an end portion of the linear member and configured to generate a magnetic attraction force between the attractive member and an attraction-responsive part that is ferromagnetic and provided to a delivery target; and a holding mechanism configured to hold the delivery target T in a state in which the attractive member and the attraction-responsive part are coupled to each other by the magnetic attraction force.

17 Claims, 3 Drawing Sheets

(51) Int. Cl.
    *B64U 101/60*     (2023.01)
    *B66C 1/08*     (2006.01)

(56) References Cited

U.S. PATENT DOCUMENTS

| | | | |
|---|---|---|---|
| 9,849,981 | B1 | 12/2017 | Burgess et al. |
| 11,377,212 | B2 * | 7/2022 | Singer ..................... B64D 1/22 |
| 11,427,318 | B2 * | 8/2022 | Williams ............... B64D 47/08 |
| 2017/0197718 | A1 | 7/2017 | Buchmueller |
| 2018/0072415 | A1 | 3/2018 | Cantrell et al. |
| 2018/0072419 | A1 | 3/2018 | Burgess et al. |
| 2018/0074521 | A1 | 3/2018 | Cantrell et al. |
| 2020/0172244 | A1 * | 6/2020 | Green ................... B64C 39/024 |

FOREIGN PATENT DOCUMENTS

| | | |
|---|---|---|
| JP | 2016-225863 A | 12/2016 |
| JP | 2017-217964 A | 12/2017 |
| JP | 2018-114822 A | 7/2018 |
| WO | 2017192488 A1 | 11/2017 |
| WO | 2018/049247 A1 | 3/2018 |

OTHER PUBLICATIONS

Japanese Notice of Reasons for Rejection a Patent for 2020-513368 dated, Jun. 9, 2020.
International Search Report for PCT/JP2019/018081 dated, Jul. 30, 2019.

\* cited by examiner

UNMANNED AERIAL VEHICLE, AERIAL VEHICLE CONTROL SYSTEM AND TRANSPORTATION METHOD

CROSS REFERENCE TO RELATED APPLICATIONS

This application is a National Stage of International Application No. PCT/JP2019/018081 filed Apr. 26, 2019.

TECHNICAL FIELD

The present invention relates to an unmanned aerial vehicle, an aerial vehicle control system and a transportation method.

BACKGROUND ART

It has been under consideration to use an aerial vehicle that can fly in an unmanned manner, such as the so-called drone, to transport a cargo. Specifically, such an aerial vehicle is provided with a box or the like for accommodating a cargo, and the cargo is delivered to a recipient while the box is opened in a state where the aerial vehicle is on the ground. In this case, a flat place having at least a certain area that allows the aerial vehicle to land is required as a place for delivering the cargo.

In view of this, a transportation method as disclosed in, for example, Patent Document 1 cited below has been under consideration. This transportation method uses an aerial vehicle equipped with a winding machine (winch) which can wind and unwind a linear member, such as a wire or a string, the linear member holding a delivery target (which may include a cargo and a container accommodating the cargo) at its end. According to the transportation method, the cargo is delivered while the aerial vehicle stays in midair without having to land on the ground.

Patent Document 1: Japanese Unexamined Patent Application, Publication No. 2016-88675

SUMMARY OF INVENTION

Technical Problem

In the case of transporting a delivery target by an unmanned aerial vehicle, consideration should be given not only to delivery of the delivery target from the unmanned aerial vehicle, but also to receipt of the delivery target by the unmanned aerial vehicle. If an unmanned aerial vehicle is to receive a delivery target at a location where the unmanned aerial vehicle cannot land, a linear member and the delivery target need to be connected to each other while the unmanned aerial vehicle is on standby in airspace above the location. Since the linear member hanging from the unmanned aerial vehicle swings due to an effect of wind or the like, it is not easy to connect the linear member to the delivery target by way of motion of the unmanned aerial vehicle in midair even if a connecting means such as an ordinary hook is provided.

One or more embodiments of the present invention has been conceived in view of the foregoing background, and an object of one or more embodiments of the present invention is to provide an unmanned aerial vehicle, an aerial vehicle control system, and a transportation method that enable a delivery target to be easily connected to an end portion of a linear member hanging from an aerial vehicle body.

Solution to Problem

An unmanned aerial vehicle according to an aspect of the present invention includes: an aerial vehicle body capable of flying; a winding machine provided to the aerial vehicle body and capable of winding and unwinding a linear member; an attractive member provided to an end portion of the linear member and configured to generate a magnetic attraction force between the attractive member and an attraction-responsive part that is ferromagnetic and provided to a delivery target; and a holding mechanism configured to hold the delivery target in a state in which the attractive member and the attraction-responsive part are coupled to each other by the magnetic attraction force.

Another aspect of the present invention is directed to an aerial vehicle control system for controlling an unmanned aerial vehicle, the unmanned aerial vehicle including: an aerial vehicle body capable of flying; a winding machine provided to the aerial vehicle body and capable of winding and unwinding a linear member; an attractive member provided to an end portion of the linear member and configured to generate a magnetic attraction force between the attractive member and an attraction-responsive part that is ferromagnetic and provided to a delivery target; and a holding mechanism configured to hold the delivery target in a state in which the attractive member and the attraction-responsive part are coupled to each other by the magnetic attraction force. The aerial vehicle control system includes: a winding controller configured to control the winding machine; an attraction controller configured to control the magnetic attraction force of the attractive member; and a hold controller configured to control holding of the delivery target by the holding mechanism.

Yet another aspect of the present invention is directed to a transportation method for transporting a delivery target using an unmanned aerial vehicle, the unmanned aerial vehicle including: an aerial vehicle body capable of flying; a winding machine provided to the aerial vehicle body and capable of winding and unwinding a linear member; an attractive member provided to an end portion of the linear member and configured to generate a magnetic attraction force between the attractive member and an attraction-responsive part that is ferromagnetic and provided to the delivery target; and a holding mechanism configured to hold the delivery target in a state in which the attractive member and the attraction-responsive part are coupled to each other by the magnetic attraction force. The transportation method includes: unwinding the linear member by the winding machine; generating the magnetic attraction force by the attractive member; and holding the delivery target by the holding mechanism.

Advantageous Effects of Invention

The present invention provides an unmanned aerial vehicle, an aerial vehicle control system, and a transportation method that enable a delivery target to be easily connected to an end portion of a linear member hanging from an aerial vehicle body.

DESCRIPTION OF EMBODIMENTS

Figure 1:
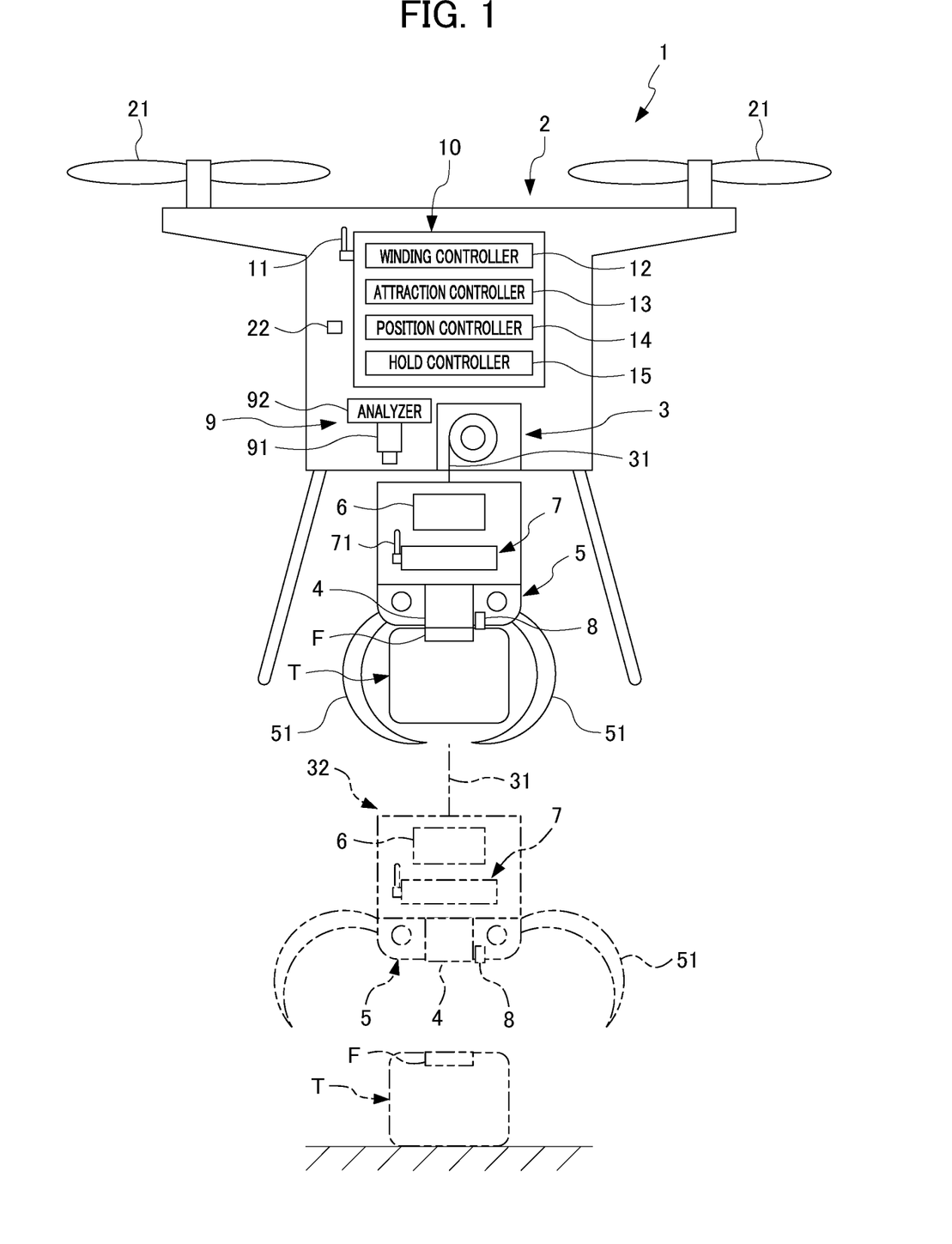
FIG. 1 is a schematic diagram showing a configuration of an unmanned aerial vehicle according to a first embodiment of the present invention.

Non-limiting exemplary embodiments of the present invention will be described below with reference to the drawings. FIG. 1 is a schematic diagram showing a configuration of an unmanned aerial vehicle 1 according to a first embodiment of the present invention. The unmanned aerial vehicle 1 flies while holding a delivery target T and thereby transports the delivery target T in an unmanned manner.

The delivery target T to be transported by the unmanned aerial vehicle 1 includes a cargo or a container accommodating the cargo (wherein the container may be empty). The delivery target T is provided with an attraction-responsive part F which is ferromagnetic and disposed on an upper side of the delivery target T. If a cargo has a member made of a ferromagnetic material in an upper portion thereof, this member may be utilized as the attraction-responsive part F. The container may be, for example, an undeformable box or the like, or may be, for example, a deformable bag or the like. The attraction-responsive part F may be a magnetized ferromagnetic material having a coercivity, i.e. a permanent magnet.

As shown in FIG. 1, the unmanned aerial vehicle 1 includes: an aerial vehicle body 2 capable of flying in an unmanned manner; a winding machine 3 provided to the aerial vehicle body 2 and capable of winding and unwinding a linear member 31, an end portion 32 of which is connectable to the delivery target T; an attractive member 4 provided to the end portion 32 of the linear member 31 and configured to generate a magnetic attraction force between the attractive member 4 and the attraction-responsive part F of the delivery target T; and a holding mechanism 5 configured to mechanically hold the delivery target T in a state in which the attractive member 4 and the attraction-responsive part F are coupled to each other by the magnetic attraction force of the attractive member 4. The unmanned aerial vehicle 1 further includes: a battery 6 provided to the end portion 32 of the linear member 31; an end control circuit 7 provided to the end portion 32 of the linear member 31 and configured to control power supply from the battery 6; a coupling detection unit 8 provided to the end portion 32 of the linear member 31 and configured to detect a coupling state between the attractive member 4 and the attraction-responsive part F; a misalignment recognition unit 9 provided to the aerial vehicle body 2 and configured to recognize a positional relationship between the attractive member 4 and the attraction-responsive part F; and a control device 10 provided to the aerial vehicle body 2 and configured to control the winding machine 3, the attractive member 4 and the holding mechanism 5.

Although the aerial vehicle body 2 is not particularly limited as long as it can fly in an unmanned manner, the aerial vehicle body 2 of the present embodiment shown in the drawings is an unmanned rotorcraft having a plurality of rotors 21. The aerial vehicle body 2 further includes: a magnetic sensor 22 for detecting an attitude of the aerial vehicle body 2; and a battery or the like (not shown) for supplying power for driving the rotors 21.

The winding machine 3 is a winch that can wind the linear member 31 when driven by a motor (not shown). A flexible member, such as a rope and a wire, is used as the linear member 31 to be wound by the winding machine 3.

The attractive member 4 may be a permanent magnet. However, in the present embodiment, the attractive member 4 is constituted by an electromagnet capable of generating and eliminating, as necessary, a magnetic field that causes a magnetic attraction force. Using an electromagnet as the attractive member 4 makes it possible to eliminate the magnetic field during flight, whereby the magnetic sensor 22 of the aerial vehicle body 2 is not inhibited from detecting terrestrial magnetism. Using an electromagnet as the attractive member 4 also makes it possible to easily disconnect the delivery target T from the attractive member 4 by way of elimination of the magnetic attraction force of the attractive member 4 at the time of delivery of the delivery target T. As can be seen, the attractive member 4 is usable also for delivery of the delivery target T.

The holding mechanism 5 can be configured to have movable supports 51 that transition between a position for holding the delivery target T and a position for releasing the delivery target T. The movable supports 51 may be configured to hold the entire delivery target T, as shown in the drawing. Alternatively, the movable supports 51 may be configured to hold only an attraction-responsive part F projecting from an upper portion of the delivery target T, or only a support structure of the attraction-responsive part F. Note that the position for holding the delivery target T includes a position in which a load of the delivery target T is not applied while the attractive member 4 is retaining the delivery target T, and in which the delivery target T can be received and prevented from falling in the case of disconnection of the delivery target T from the attractive member 4.

The battery 6 is a power source for supplying power to the attractive member 4 and the holding mechanism 5. Disposing the battery 6 in the end portion 32 of the linear member 31 eliminates need for a wire for supplying power from the aerial vehicle body 2 to the attractive member 4 and the holding mechanism 5. This configuration makes it less likely that an unnecessary magnetic field is formed in the aerial vehicle body 2 when the attractive member 4 and the holding mechanism 5 are in operation, and that such an unnecessary magnetic field inhibits the magnetic sensor 22 from detecting terrestrial magnetism or the like.

The end control circuit 7 allows or shuts off power supply from the battery 6 to the attractive member 4 and the holding mechanism 5. The end control circuit 7 has a communication unit 71 for communicating with the control device 10 to be described later, and is configured to allow power supply from the battery 6 to the attractive member 4, in response to a predetermined radio signal received from the control device 10. The end control circuit 7 is configured to control power supply to the holding mechanism 5, based on a radio signal received from the control device 10. The end control circuit 7 is preferably configured to transmit, via the communication unit 71, information about states of the attractive member 4 and the holding mechanism 5, information detected by the coupling detection unit 8, and the like to the control device 10.

The coupling detection unit 8 detects that the attractive member 4 and the attraction-responsive part F are magnetically coupled to each other by the magnetic attraction force of the attractive member 4, i.e., that the attractive member 4 substantially frontally faces the attraction-responsive part F due to the magnetic attraction force of the attractive member 4. The coupling detection unit 8 may detect that the attractive member 4 is pressed onto the attraction-responsive part F by the magnetic attraction force, or that the attractive member 4 is magnetically coupled to the attraction-responsive part F to such an extent that the relative position between the attractive member 4 and the attraction-responsive part F is less likely to change. Specifically, the coupling detection unit 8 may be configured to detect a positional relationship between the attractive member 4 and the attraction-responsive part F by using, for example, a photoelectric sensor or a limit switch. Alternatively, the coupling detection unit 8 may be configured to detect that the attractive member 4 is magnetically coupled to the attraction-responsive part F based on, for example, a change in the magnetic field generated by the attractive member 4.

The misalignment recognition unit 9 recognizes a misalignment of the attractive member 4 with respect to the attraction-responsive part F, as viewed from the aerial vehicle body 2. As shown in the drawing, an image processing system can be used as the misalignment recognition unit 9. The image processing system has a camera 91 provided to the aerial vehicle body 2 and an analyzer 92 that processes images taken by the camera 91 and calculates misalignment of the attractive member 4 with respect to the attraction-responsive part F. The analyzer 92 may be integral with the control device 10 to be described later.

The control device 10 has a communication unit 11. For example, the control device 10 can be implemented by a computer device including a CPU, a memory, a communication module constituting the communication unit 11, and having a predetermined program loaded in the computer device.

The control device 10 may be provided away from the unmanned aerial vehicle 1 and may be configured to control motion of the unmanned aerial vehicle 1 in cooperation with an external server (remote control device) that communicates with the control device 10. Alternatively, the control device 10 may be configured to control the motion of the unmanned aerial vehicle 1 alone. In other words, the control device 10 constitutes at least part of the aerial vehicle control system according to an embodiment of the present invention, the aerial vehicle control system controlling motion of the unmanned aerial vehicle 1. In the present embodiment, the control device 10 in the unmanned aerial vehicle 1 will be described on the precondition that the control device 10 per se and alone constitutes an aerial vehicle control system according to an embodiment of the present invention, and can independently pick up the delivery target T and transport the delivery target T to a destination, even without instructions from the remote control device.

The control device 10 controls the aerial vehicle body 2 so that the unmanned aerial vehicle 1 flies to a destination which is set each time. Further, the control device 10 controls the aerial vehicle body 2, the winding machine 3, the attractive member 4 and the holding mechanism 5 for receipt and delivery of the delivery target T.

In order to control the motion for receiving the delivery target T, the control device 10 has: a winding controller 12 for controlling the winding machine 3; an attraction controller 13 for causing the attractive member 4 to generate a magnetic attraction force; a position controller 14 for aligning the attractive member 4 with the attraction-responsive part F; and a hold controller 15 for causing the holding mechanism 5 to hold the delivery target T. The winding controller 12, the attraction controller 13, the position controller 14 and the hold controller 15 are functionally distinguishable, and do not need to be independent in terms of mechanical structure and program structure.

The winding controller 12 causes the winding machine 3 to unwind the linear member 31 in a state in which the aerial vehicle body 2 is hovering above a point that is set as a location for receipt of the delivery target T. Further, the winding controller 12 causes the linear member 31 to be wound after the holding mechanism 5 has begun to hold the delivery target T.

The attraction controller 13 causes the attractive member 4 to generate the magnetic attraction force by causing the communication unit 11 to transmit a radio signal instructing the end control circuit 7 to allow power supply from the battery 6 to the attractive member 4, in a state in which the winding machine 3 has unwound the liner member 31 and the attractive member 4 is sufficiently spaced apart from the aerial vehicle body 2. This configuration, in which after the winding machine 3 has unwound the linear member 31, the end control circuit 7 allows power supply to the attractive member 4, makes it less likely that a magnetic field generated by the attractive member 4 inhibits the magnetic sensor 22 from detecting terrestrial magnetism or the like.

After the holding mechanism 5 has begun to hold the delivery target T, and before the winding machine 3 winds the linear member 31 to bring the attractive member 4 into a proximity to the aerial vehicle body 2, the attraction controller 13 causes the end control circuit 7 to shut off power supply from the battery 6 to the attractive member 4. This configuration in which the attractive member 4 eliminates the magnetic attraction force before being winched up to the proximity to the aerial vehicle body 2 makes it less likely that the magnetic sensor 22 is inhibited from detecting terrestrial magnetism or the like.

The position controller 14 aligns the attractive member 4 with the attraction-responsive part F, based on a result of recognition of the misalignment recognition unit 9. Specifically, the position controller 14 moves the aerial vehicle body 2 in a direction to reduce the misalignment between the attractive member 4 and the attraction-responsive part F recognized by the misalignment recognition unit 9. The position controller 14 continues this control at least until the coupling detection unit 8 detects the coupling between the attractive member 4 and the attraction-responsive part F, and preferably until the holding mechanism 5 completely holds the delivery target T.

The hold controller 15 causes the holding mechanism 5 to hold the delivery target T in response to detection of coupling between the attractive member 4 and the attraction-responsive part F by the coupling detection unit 8. That is, in a state in which the attractive member 4 attracts and frontally faces the attraction-responsive part F, the holding mechanism 5 actuates the movable supports 51 such that the movable supports 51 hold the delivery target T.

As described above, the unmanned aerial vehicle 1 can receive a delivery target T without human intervention, due to the configuration in which the attractive member 4 attracts the attraction-responsive part F of the delivery target T so that the end portion 32 of the linear member 31 hanging from the aerial vehicle body 2 is connected to the delivery target T without human intervention.

To deliver the delivery target T, the unmanned aerial vehicle 1 may land the aerial vehicle body 2. Alternatively, the unmanned aerial vehicle 1 may deliver the delivery target T by keeping the aerial vehicle body 2 stationary in midair, causing the winding machine 3 to unwind the linear member 31, and opening the holding mechanism 5 on the ground.

Figure 2:
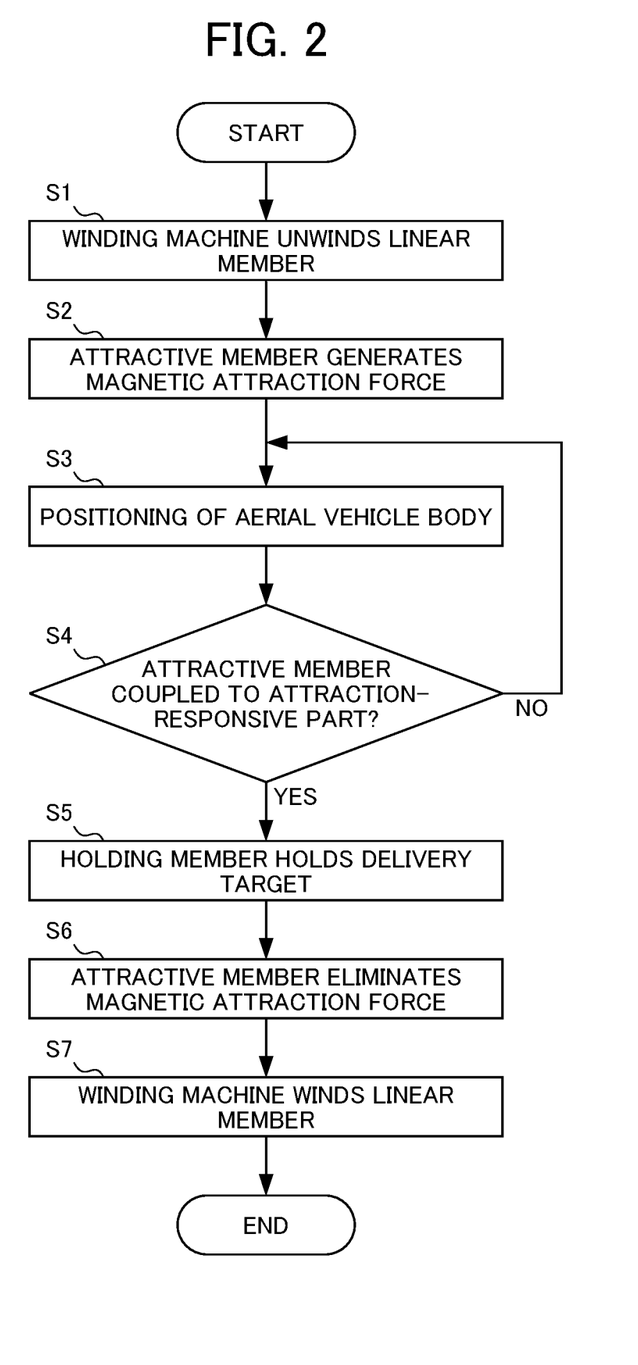
FIG. 2 is a flowchart showing a procedure according to which the unmanned aerial vehicle of FIG. 1 receives a delivery target.

A method for transporting a delivery target T using the above-described unmanned aerial vehicle 1 can be carried out under the control of the control device 10 and without human intervention. FIG. 2 shows a procedure for receiving the delivery target T, according to the method for transporting the delivery target T using the unmanned aerial vehicle 1. The control shown in FIG. 2 is performed after the aerial vehicle body 2 has arrived at airspace above the receiving point of the delivery target T.

The procedure for receiving the delivery target T by the unmanned aerial vehicle 1 includes: a step of unwinding the linear member 31 by the winding machine 3 (Step S1: unwinding step); a step of generating a magnetic attraction force by the attractive member 4 (Step S2: attraction force generating step); a step of positioning the attractive member 4 with respect to the attraction-responsive part F (Step S3: positioning step); a step of detecting a state in which the attractive member 4 attracts the attraction-responsive part F (Step S4: attraction detecting step); a step of holding the delivery target T by the holding mechanism 5 (Step S5: holding step); a step of eliminating the magnetic attraction force by the attractive member 4 (Step S6: attraction force eliminating step); and a step of winding the linear member 31 by the winding machine 3 (Step S7: winding step).

In Step S1 as the unwinding step, the winding machine 3 is caused to unwind the linear member 31 so that the attractive member 4 and the holding mechanism 5 descend toward an upper portion of the delivery target T.

In Step S2 as the attraction force generating step, the end control circuit 7 is caused to begin power supply to the attractive member 4. This step results in the generation of a magnetic attraction force between the attractive member 4 and the attraction-responsive part F.

In Step S3 as the positioning step, the position of the aerial vehicle body 2 is finely adjusted based on a result of recognition of the misalignment recognition unit 9, so that the attractive member 4 is positioned directly above the attraction-responsive part F. As a result of this step, the attractive member 4 comes close to the attraction-responsive part F, and the magnetic attraction force of the attractive member 4 magnetically couples the attractive member 4 and the attraction-responsive part F to each other.

In Step S4 as the attraction detecting step, the coupling detection unit 8 detects a state of coupling between the attractive member 4 and the attraction-responsive part F, i.e., whether the attractive member 4 and the attraction-responsive part F are connected to each other as a result of the magnetic coupling. If it is determined that the attractive member 4 and the attraction-responsive part F are connected to each other in the attraction detecting step, the procedure proceeds to Step S5. If it is determined that the attractive member 4 and the attraction-responsive part F are not connected in the attraction detecting step, the procedure returns to Step S3. That is, Step S3 as the positioning step is continuously carried out until the attractive member 4 and the attraction-responsive part F are connected to each other.

In Step S5 as the holding step, the holding mechanism 5 holds the delivery target T, so that the delivery target T is mechanically connected to the end portion 32 of the linear member 31.

In Step S6 as the attraction force eliminating step, the attractive member 4 is caused to eliminate the magnetic attraction force. Since the holding mechanism 5 has begun to hold the delivery target T in the holding step, the connection between the delivery target T and the linear member 31 is not undone even though the attractive member 4 eliminates the magnetic attraction force. Further, Since the holding mechanism 5 holds the delivery target T with the power supply to the attractive member 4 shut down, power consumption can be reduced.

In Step S7 as the winding step, the winding machine 3 is caused to wind the linear member 31, so that the attractive member 4 and the holding mechanism 5 holding the delivery target T come close to the aerial vehicle body 2. This step reduces relative movement of the delivery target T with respect to the aerial vehicle body 2, thereby contributing to stabilization of flight of the unmanned aerial vehicle 1.

Note that Step S5 as the holding step and Step S6 as the attraction force eliminating step may be carried out in the middle of Step S7 as the winding step. In other words, it is suitable that the holding step and the attraction force eliminating step are carried out before the attractive member 4 comes close to the aerial vehicle body 2 and affects the magnetic sensor 22. In particular, when it is difficult to insert the movable supports 51 between the delivery target T and the ground, it is preferable that the winding machine 3 wind a certain amount of the linear member 31 in a state where the delivery target T is held by the attractive member 4 so as to lift the delivery target T slightly, and then, the holding mechanism 5 begins to hold the delivery target T.

As described above, the unmanned aerial vehicle 1, the aerial vehicle control system (control device 10) and the transportation method according to the present embodiment enables the delivery target T to be easily connected to the end of the linear member 31 hanging from the aerial vehicle body 2. Thus, the unmanned aerial vehicle 1 can receive the delivery target T placed at a specified location without human intervention and transport the delivery target T to a set destination.

While being capable of receiving a cargo from a shipper, the unmanned aerial vehicle 1 can be used to collect a delivery container accommodating and protecting a cargo. Generally, completion of delivery of a cargo requires acknowledgement of receipt by a recipient. For this reason, a cargo can only be delivered when the recipient is at home. Recipients find it inconvenient to need to be at home in order to receive a delivery target T. To avoid this inconvenience, it has been under consideration to complete delivery even in the absence of a recipient, by placing a cargo at a designated location, with the consent of the recipient. In the case of placing a cargo at a designated location in this manner, in order to protect the cargo, it is worthy of consideration to accommodate the cargo in a dedicated delivery container and to place the cargo together with the delivery container at the designated location.

If importance is attached to the protection of the cargo, a relatively expensive delivery container needs to be used. It is therefore desirable that the delivery container be collected and reused after a recipient has taken out a cargo. It is desirable that the unmanned aerial vehicle 1 carry out collection of the empty delivery container, as well as the delivery of the cargo. In order to collect the delivery container by the unmanned aerial vehicle 1, it is necessary to connect the delivery container (delivery target T) to the end of the linear member 31 hanging from the aerial vehicle body 2 above the delivery container. Considering the purpose of completing delivery in the absence of a recipient, it is impractical to ask the recipient to connect the delivery target T to the linear member 31 when the delivery container is to be collected. For this reason, the unmanned aerial vehicle 1, which includes the attractive member 4 and can easily connect the delivery target T to the end portion 32 of the linear member 31, is particularly useful for collecting an empty delivery container.

Figure 3:
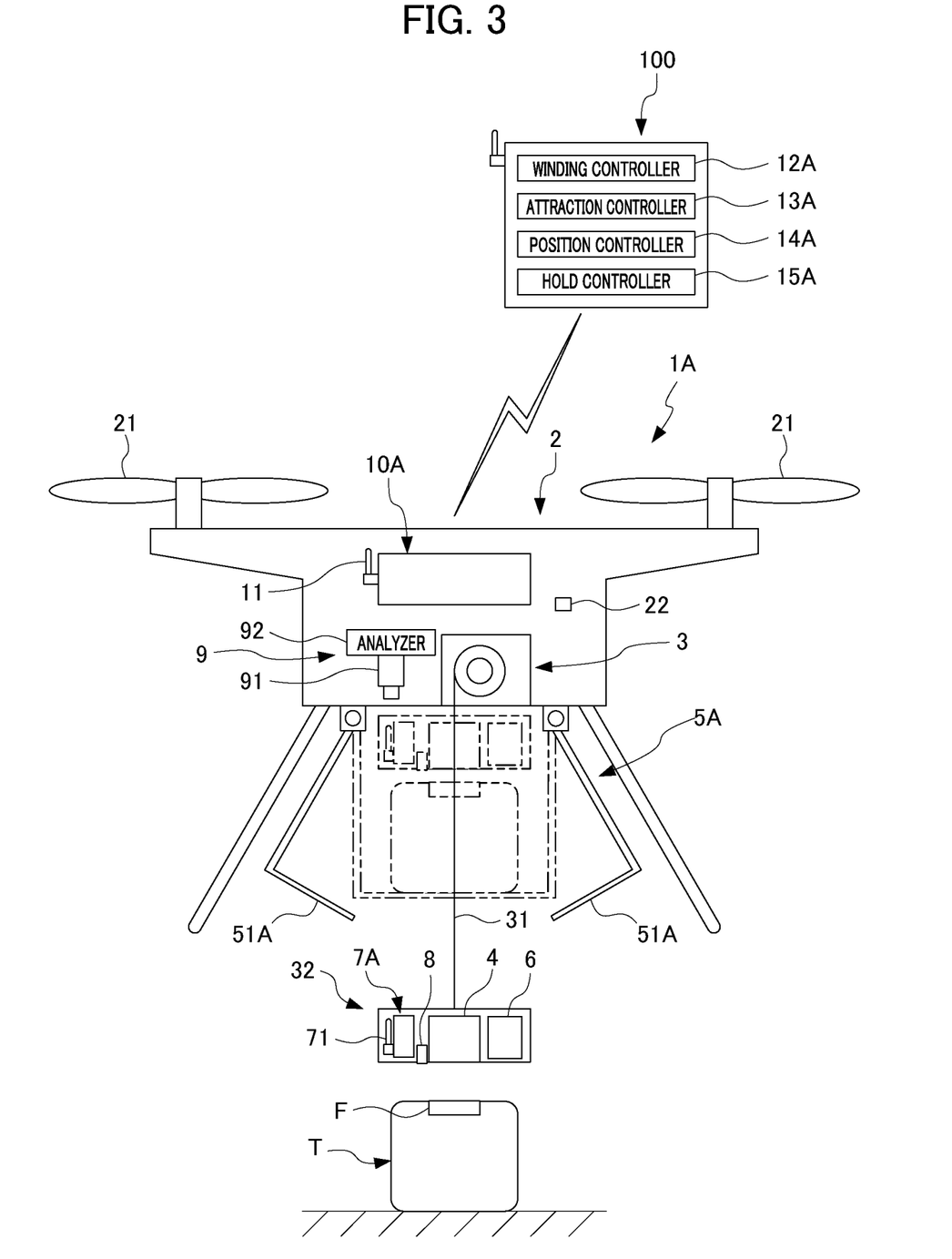
FIG. 3 is a schematic diagram showing a configuration of a transportation system including an unmanned aerial vehicle according to a second embodiment of the present invention.

FIG. 3 is a schematic diagram showing a configuration of a transportation system including an unmanned aerial vehicle 1A according to a second embodiment of the present invention. The transportation system includes the unmanned aerial vehicle 1A and a remote control device 100 provided away from the unmanned aerial vehicle 1A.

The unmanned aerial vehicle 1A includes: an aerial vehicle body 2 capable of flying in an unmanned manner; a winding machine 3 provided to the aerial vehicle body 2 and capable of winding and unwinding a linear member 31 an end of which is connectable to the delivery target T; an attractive member 4 provided to an end portion 32 of the linear member 31 and configured to generate a magnetic attraction force between the attractive member 4 and an attraction-responsive part F of the delivery target T; a holding mechanism 5A provided to the aerial vehicle body 2 and configured to mechanically hold the delivery target T in a state in which the attractive member 4 and the attraction-responsive part F are coupled to each other by the magnetic attraction force when the winding machine 3 has wound the linear member 31; a battery 6 provided to the end portion 32 of the linear member 31; an end control circuit 7A provided to the end portion 32 of the linear member 31 and configured to control power supply from the battery 6; a coupling detection unit 8 provided to the end portion 32 of the linear member 31 and configured to detect a coupling state between the attractive member 4 and the attraction-responsive part F; a misalignment recognition unit 9 provided to the aerial vehicle body 2 and configured to recognize a positional relationship between the attractive member 4 and the attraction-responsive part F; and a control device 10A provided to the aerial vehicle body 2 and configured to control the winding machine 3, the attractive member 4 and the holding mechanism 5. Note that the state in which the attractive member 4 and the attraction-responsive part F are coupled to each other by the magnetic attraction force includes not only a state in which the attractive member 4 and the attraction-responsive part F are in contact with each other, but also a state in which the attraction-responsive part F has been attracted toward, and is close to, the attractive member 4 by the magnetic attraction force.

The configurations of the aerial vehicle body 2, the winding machine 3, the battery 6, the coupling detection unit 8, and the misalignment recognition unit 9 of the unmanned aerial vehicle 1A shown in FIG. 3 are the same or similar to those of the aerial vehicle body 2, the winding machine 3, the battery 6, the coupling detection unit 8 and the misalignment recognition unit 9 of the unmanned aerial vehicle 1 shown in FIG. 1. Therefore, in the description of the unmanned aerial vehicle 1A of FIG. 3, the same components as those of the unmanned aerial vehicle 1 of FIG. 1 are denoted by the same reference characters, and overlapping description will be omitted.

The holding mechanism 5A can be configured to have movable supports 51A that transition between a position for holding the delivery target T and a position for releasing the delivery target T. The movable supports 51A may be configured to hold the entire delivery target T, as shown in the drawing. Alternatively, the movable supports 51A may be configured to hold only an attraction-responsive part F projecting from an upper portion of the delivery target T, or only a support structure of the attraction-responsive part F.

The end control circuit 7A allows or shuts off power supply from the battery 6 to the attractive member 4. The end control circuit 7A has a communication unit 71 for communicating with the control device 10A to be described later, and is configured to allow power supply from the battery 6 to the attractive member 4, in response to a predetermined radio signal received from the control device 10A.

In the present embodiment, the local control device 10A and the remote control device 100 constitute an embodiment of the aerial vehicle control system according to the present invention. In other words, in the transportation system of the present embodiment, the local control device 10A and the remote control device 100 cooperate to control the unmanned aerial vehicle 1A.

The local control device 10A of the unmanned aerial vehicle 1A of FIG. 3 differs only in control program from the control device 10 of the unmanned aerial vehicle 1 of FIG. 1.

The remote control device 100 wirelessly communicates with the local control device 10A, and provides the local control device 10A with instructions on at least part of a control procedure of the unmanned aerial vehicle 1A. In the illustrated example, the remote control device 100 has: a winding controller 12A for controlling the winding machine 3; an attraction controller 13A for controlling the attractive member 4; a position controller 14A for controlling the aerial vehicle body 2 so as to align the attractive member 4 with the attraction-responsive part F; and a hold controller 15A for causing the holding mechanism 5A to hold the delivery target T. The control performed by the winding controller 12A, the attraction controller 13A, the position controller 14A and the hold controller 15A of the unmanned aerial vehicle 1A shown in FIG. 3 is the same or similar to the control performed by the winding controller 12, the attraction controller 13, the position controller 14 and the hold controller 15 of the unmanned aerial vehicle 1 shown in FIG. 1.

Like the unmanned aerial vehicle 1 of the first embodiment, the unmanned aerial vehicle 1A, the aerial vehicle control system and the transportation method according to the present embodiment enable the delivery target T to be easily connected to the end portion 32 of the linear member 31 hanging from the aerial vehicle body 2.

Since the unmanned aerial vehicle 1A according to the present embodiment includes the holding mechanism 5A provided on the aerial vehicle body 2, the holding mechanism 5A holds the delivery target T after the winding machine 3 has wound the linear member 31 and winched up the delivery target T to a proximity to the aerial vehicle body 2 while the attractive member 4 retains the delivery target T by way of its magnetic attraction force. At this time, the attractive member 4 temporarily affects the magnetic sensor 22, which does not hinder the flight of the unmanned aerial vehicle 1A since the magnetic sensor 22 operates normally when the aerial vehicle body 2 moves. In addition, since the holding mechanism 5A holds the delivery target T during the flight of the unmanned aerial vehicle 1A, the delivery target T can be prevented from being disconnected from the linear member 31 and from falling due to, for example, vibration caused during the flight.

The unmanned aerial vehicle 1A may deliver the delivery target T in the following manner. The unmanned aerial vehicle 1A retains the delivery target T at the end portion 32 of the linear member 31 by way of the attractive member 4 attracting the attraction-responsive part F; opens the holding mechanism 5A and causes the winding machine 3 to unwind the linear member 31 so that the delivery target T descends to the ground; and then, eliminates the magnetic attraction force of the attractive member 4.

As can be appreciated from the foregoing description, the following configurations exert respective advantageous effects.

An unmanned aerial vehicle (1, 1A) according to an embodiment of the present invention includes: an aerial vehicle body (2) capable of flying; a winding machine (3) provided to the aerial vehicle body (2) and capable of winding and unwinding a linear member (31); an attractive member (4) provided to an end portion (32) of the linear member (31) and configured to generate a magnetic attraction force between the attractive member (4) and an attraction-responsive part (F) that is ferromagnetic and provided to a delivery target (T); and a holding mechanism (5) configured to hold the delivery target (T) in a state in which the attractive member (4) and the attraction-responsive part (F) are coupled to each other by the magnetic attraction force. The unmanned aerial vehicle (1, 1A) can easily connect the delivery target (T) to the linear member (31) by way of the attractive member (4) attracting the attraction-responsive part (F) of the delivery target (T). In addition, since the holding mechanism (5) can hold the delivery target (T) coupled to the attractive member (4) by the magnetic attraction force, the unmanned aerial vehicle (1, 1A) can reliably transport the delivery target (T) while preventing the delivery target (T) from falling.

In the unmanned aerial vehicle (1, 1A), the attractive member (4) is an electromagnet. With this feature, once the holding mechanism (5) begins to hold the delivery target (T), a magnetic field of the attractive member (4) generating the magnetic attraction force is eliminated, thereby contributing to prevention of adverse effect on flight of the aerial vehicle body (2).

The unmanned aerial vehicle (1, 1A) further includes a battery (6) that supplies power to the electromagnet (4). With this feature, the attractive member (4) can be caused to generate the magnetic attraction force.

The unmanned aerial vehicle (1, 1A) further includes an end control circuit (7, 7A) configured to allow power supply from the battery to the electromagnet (4) upon receiving a predetermined signal. This feature enables the attractive member (4) to generate the magnetic attraction force at an appropriate timing.

In the unmanned aerial vehicle (1, 1A), the end control circuit (7, 7A) allows power supply to the electromagnet (4) in a state in which the winding machine (3) has unwound the linear member (31). This feature makes it possible to further reliably inhibit the magnetic field of the attractive member (4) from affecting the aerial vehicle body (2).

In the unmanned aerial vehicle (1, 1A), the end control circuit (7, 7A) shuts off the power supply to the electromagnet (4) after the holding mechanism (5, 5A) has begun to hold the delivery target (T). This feature makes it possible to further reliably inhibit the magnetic field of the attractive member (4) from affecting the aerial vehicle body (2).

In the unmanned aerial vehicle (1), the winding machine (3) winds the linear member (31) in a state in which the end control circuit (7) has shut off the power supply to the electromagnet (4). This feature makes it possible to prevent the magnetic field of the attractive member (4) from affecting the aerial vehicle body (2).

In the unmanned aerial vehicle (1), the end control circuit (7, 7A) is provided to the end portion (32) of the linear member (31). This feature makes it possible to reduce an effect of the magnetic field of the attractive member (4) when the attractive member (4) connects the delivery target (T) to the linear member (31).

In the unmanned aerial vehicle (1), the battery (6) is provided to the end portion (32) of the linear member. This feature eliminates need to electrically connect the aerial vehicle body (2) to the attractive member (4), thereby reliably inhibiting the magnetic field of the attractive member (4) from affecting the aerial vehicle body (2).

In the unmanned aerial vehicle (1, 1A), the aerial vehicle body (2) has a magnetic sensor (22). With this feature, the effect of the magnetic field of the attractive member (4) is inhibited remarkably.

In the unmanned aerial vehicle (1), the holding mechanism (5) is provided to the end portion (32) of the linear member (31) and holds the delivery target (T) in a state in which the winding machine (3) has unwound the linear member (31). This feature makes it possible to inhibit the magnetic field of the attractive member (4) from affecting the aerial vehicle body (2).

In the unmanned aerial vehicle (1), the winding machine (3) winds the linear member (31) after the holding mechanism (5) has begun to hold the delivery target (T). This feature makes it possible to further reliably inhibit the magnetic field of the attractive member (4) from affecting the aerial vehicle body (2).

The unmanned aerial vehicle (1, 1A) further includes a misalignment recognition unit configured to recognize a positional relationship between the attractive member (4) and the attraction-responsive part (F). This feature allows the attractive member (4) to further easily attract the delivery target (T) and to connect the delivery target (T) to the linear member (31).

In the unmanned aerial vehicle (1, 1A), the aerial vehicle body (2) flies so as to align the attractive member (4) with the attraction-responsive part (F), based on a result of recognition of the misalignment recognition unit. This feature allows the attractive member (4) to further reliably attract the deliver target (T) and to connect the delivery target (T) to the linear member (31).

The unmanned aerial vehicle (1) further includes a coupling detection unit (8) configured to detect a coupling state between the attractive member (4) and the attraction-responsive part (F), wherein the holding mechanism (5) begins to hold the delivery target (T) in response to detection of coupling between the attractive member (4) and the attraction-responsive part (F) by the coupling detection unit (8). This feature allows the holding mechanism (5) to reliably hold the delivery target (T).

The unmanned aerial vehicle (1, 1A) further includes a control device (10, 10A) provided to the aerial vehicle body (2) and configured to control at least one of the winding machine (3), the attractive member (4) and the holding mechanism (5, 5A). This feature enables the unmanned aerial vehicle (1, 1A) to perform motion for suitably holding the delivery target (T).

An aerial vehicle control system according to an embodiment of the present invention is intended to control an unmanned aerial vehicle (1, 1A). The unmanned aerial vehicle (1, 1) includes: an aerial vehicle body (2) capable of flying; a winding machine (3) provided to the aerial vehicle body (2) and capable of winding and unwinding a linear member (31); an attractive member (4) provided to an end portion (32) of the linear member (31) and configured to generate a magnetic attraction force between the attractive member (4) and an attraction-responsive part (F) that is ferromagnetic and provided to the delivery target (T); and a holding mechanism (5, 5A) configured to hold the delivery target (T) in a state in which the attractive member (4) and the attraction-responsive part (F) are coupled to each other by the magnetic attraction force. The aerial vehicle control system has: a winding controller (12, 12A) configured to control the winding machine (3); an attraction controller (13, 13A) configured to control the magnetic attraction force of the attractive member (4); and a hold controller (15, 15A) configured to control holding of the delivery target (T) by the holding mechanism (5, 5A). The aerial vehicle control system according to an embodiment of the present invention can easily connect the delivery target (T) to the linear member (31) by magnetically coupling the attraction-responsive part (F) of the delivery target (T) to the attractive member (4). Further, the aerial vehicle control system according to the embodiment of the present invention, in which the holding mechanism (5) holds the delivery target (T) magnetically coupled to the attractive member (4), can reliably transport the delivery target (T) while preventing the delivery target (T) from falling.

The aerial vehicle control system according to the embodiment of the present invention further includes: a local control device (10A) provided to the aerial vehicle body (2) and configured to control the aerial vehicle body (2), the winding machine (3) and the holding mechanism (5A); and a remote control device (100) provided away from the unmanned aerial vehicle (1A), communicating with the local control device (10A), and configured to provide the local control device (10A) with instructions on at least part of a control procedure. Embodying part of the control-related configuration as the remote control device (100) separated from the unmanned aerial vehicle (1A) makes it possible to process more information.

A transportation method according to an embodiment of the present invention is intended to transport a delivery target (T) using an unmanned aerial vehicle (1, 1A). The unmanned aerial vehicle (1, 1A) includes: an aerial vehicle body (2) capable of flying; a winding machine (3) provided to the aerial vehicle body (2) and capable of winding and unwinding a linear member (31); an attractive member (4) provided to an end portion (32) of the linear member (31) and configured to generate a magnetic attraction force between the attractive member (4) and an attraction-responsive part (F) that is ferromagnetic and provided to the delivery target (T); and a holding mechanism (5, 5A) configured to hold the delivery target (T) in a state in which the attractive member (4) and the attraction-responsive part (F) are coupled to each other by the magnetic attraction force. The transportation method includes: unwinding the linear member (31) by the winding machine (3); generating the magnetic attraction force by the attractive member (4); and holding the delivery target (T) by the holding mechanism (5, 5A). The transportation method according to the embodiment of the present invention enables the delivery target (T) to be easily connected to the linear member (31) by causing the attractive member (4) to attract the attraction-responsive part (F) of the delivery target (T). The transportation method according to the embodiment of the present invention, in which the holding mechanism (5) holds the delivery target (T) magnetically coupled to the attractive member (4), can reliably transport the delivery target (T) while preventing the delivery target (T) from falling.

Two embodiments of the present invention have been described in the foregoing. However, the present invention is not limited to the above-described embodiments, but encompasses variations, improvements and the like within the scope in which the object of the present invention can be achieved.

In the unmanned aerial vehicle 1, 1A according to an embodiment of the present invention, the aerial vehicle body 2 is not limited to an unmanned rotorcraft, but may be, for example, an unmanned airship or the like.

In the unmanned aerial vehicle 1, 1A according to an embodiment of the present invention, an operator may check a coupling state between the attractive member 4 and the attraction-responsive part F by way of, for example, images taken by a camera provided to the aerial vehicle body 2, and may operate the winding machine 3 and the holding mechanism 5, 5A.

The unmanned aerial vehicle 1, 1A, the aerial vehicle control system and the transportation method according to an embodiment of the present invention may be configured such that an operator uses the remote control device 100 or the like to cause, at his/her own discretion, the unmanned aerial vehicle to perform motion to hold the delivery target.

In the unmanned aerial vehicle 1, 1A according to an embodiment of the present invention, the winding machine 3, the attractive member 4 and the holding mechanism 5 do not need to be operable in response to signals from the control device 10, 10A and may collect information from another component to determine their own operation.

In the unmanned aerial vehicle 1, 1A according to an embodiment of the present invention, the battery 6 and a configuration equivalent to the end control circuit 7, 7A may be provided to the aerial vehicle body 2, and electrical wiring may be provided between the aerial vehicle body 2 the attractive member 4 and the holding mechanism 5. In this case, the battery 6 provided to the aerial vehicle body 2 may be used as a battery that supplies power not only for actuating the attractive member 4, but also for driving the magnetic sensor 22 and the rotors 21. Further, the end control circuit 7, 7A may be integral with the control device 10, 10A.

The unmanned aerial vehicle 1 according to an embodiment of the present invention may further include a mechanism provided to the aerial vehicle body 2 and retaining the holding mechanism 5 provided to the end portion 32 of the linear member 31.

In the unmanned aerial vehicle 1, 1A according to an embodiment of the present invention, the attractive member 4 may be a permanent magnet. In particular, in the case where the holding mechanism 5 is provided to the end portion 32 of the linear member 31, it is suitable for the attractive member 4 to be capable of stopping swinging of the linear member 31. Therefore, a configuration can be achieved which allows the attractive member 4 to be relatively easily disconnected from the delivery target T.

In the unmanned aerial vehicle 1, 1A according to an embodiment of the present invention, the end control circuit 7, 7A may be configured to change a state of power supply to the attractive member 4 based on a signal inputted through the linear member 31 or a signal line which is provided separately.

EXPLANATION OF REFERENCE NUMERALS 1, 1A: Unmanned Aerial Vehicle
2: Aerial Vehicle Body
22: Magnetic Sensor
3: Winding Machine
31: Linear Member
32: End Portion
4: Attractive Member
5, 5A: Holding Mechanism
51, 51A: Movable Support
6: Battery
7, 7A: End Control Circuit 8: Coupling Detection Unit
9: Misalignment Recognition Unit
91: Camera
92: Analyzer
10, 10A: Control Device
11: Communication Unit
12, 12A: Winding Controller
13, 13A: Attraction Controller
14, 14A: Position Controller
15, 15A: Hold Controller
F: Attraction-Responsive Part
T: Delivery Target

The invention claimed is:

1. An unmanned aerial vehicle comprising:
an aerial vehicle body capable of flying;
a winding machine provided to the aerial vehicle body and capable of winding and unwinding a linear member;
an end portion of the linear member, comprising an electromagnet configured to generate a magnetic attraction force between the electromagnet and an attraction-responsive part that is ferromagnetic and provided to a delivery target;
a battery configured to supply power to the electromagnet;
an end control circuit configured to allow supply of power from the battery to the electromagnet upon receiving a predetermined signal; and
a holding mechanism comprising at least one movable support, the holding mechanism configured to hold the delivery target in a state in which the electromagnet and the attraction-responsive part are coupled to each other by the magnetic attraction force.

2. The unmanned aerial vehicle according to claim 1, wherein
the end control circuit is configured to allow the supply of power to the electromagnet in a state in which the winding machine has unwound the linear member.

3. The unmanned aerial vehicle according to claim 1, wherein
the end control circuit is configured to shut off supply of power to the electromagnet after the holding mechanism has begun to hold the delivery target.

4. The unmanned aerial vehicle according to claim 3, wherein
the winding machine is configured to wind the linear member in a state in which the end control circuit has shut off the supply of power to the electromagnet.

5. The unmanned aerial vehicle according to claim 1, wherein
the end portion of the linear member further comprises the end control circuit.

6. The unmanned aerial vehicle according to claim 1, wherein
the end portion of the linear member further comprises the battery.

7. The unmanned aerial vehicle according to claim 1, wherein
the aerial vehicle body comprises a magnetic sensor configured to detect an attitude of the aerial vehicle body.

8. The unmanned aerial vehicle according to claim 1, wherein
the end portion of the linear member further comprises the holding mechanism, and
the holding mechanism is configured to hold the delivery target in a state in which the winding machine has unwound the linear member.

9. The unmanned aerial vehicle according to claim 8, wherein
the winding machine is configured to wind the linear member after the holding mechanism has begun to hold the delivery target.

10. The unmanned aerial vehicle according to claim 1, further comprising:
a misalignment recognition unit configured to recognize a positional relationship between the electromagnet and the attraction-responsive part.

11. The unmanned aerial vehicle according to claim 10, wherein
the aerial vehicle body is configured to fly so as to align the electromagnet with the attraction-responsive part, based on a result of recognition of the misalignment recognition unit.

12. The unmanned aerial vehicle according to claim 1, wherein
the aerial vehicle body comprises a control device configured to control at least one of the winding machine, the electromagnet, and the holding mechanism.

13. An unmanned aerial vehicle comprising:
an aerial vehicle body capable of flying;
a winding machine provided to the aerial vehicle body and capable of winding and unwinding a linear member;
an end portion of the linear member, comprising an attractive member configured to generate a magnetic attraction force between the attractive member and an attraction-responsive part that is ferromagnetic and provided to a delivery target;
a holding mechanism comprising at least one movable support, the holding mechanism configured to hold the delivery target in a state in which the attractive member and the attraction-responsive part are coupled to each other by the magnetic attraction force; and
a coupling detection unit configured to detect a coupling state between the attractive member and the attraction-responsive part, the coupling detection unit comprising at least one of a photoelectric sensor, a limit switch, and a magnetic field sensor, wherein
the holding mechanism is configured to begin to hold the delivery target in response to detection of coupling between the attractive member and the attraction-responsive part by the coupling detection unit.

14. An aerial vehicle control system comprising an unmanned aerial vehicle and a control device,
the unmanned aerial vehicle comprising:
an aerial vehicle body capable of flying;
a winding machine provided to the aerial vehicle body and capable of winding and unwinding a linear member;
an end portion of the linear member, comprising an electromagnet configured to generate a magnetic attraction force between the electromagnet and an attraction-responsive part that is ferromagnetic and provided to a delivery target;
a battery configured to supply power to the electromagnet;
an end control circuit configured to allow supply of power from the battery to the electromagnet upon receiving a predetermined signal; and
a holding mechanism comprising at least one movable support, the holding mechanism configured to hold the delivery target in a state in which the electromagnet and the attraction-responsive part are coupled to each other by the magnetic attraction force, the control device comprising:
- a winding controller configured to control the winding machine;
- an attraction controller configured to control the magnetic attraction force of the electromagnet; and
- a hold controller configured to control holding of the delivery target by the holding mechanism.

15. The aerial vehicle control system according to claim 14, wherein
the aerial vehicle body comprises a local control device and configured to control the aerial vehicle body, the winding machine and the holding mechanism; and
the control device is a remote control device provided away from the unmanned aerial vehicle, the remote control device being configured to communicate with the local control device and provide the local control device with instructions on at least part of a control procedure.

16. A delivery target transportation method using an unmanned aerial vehicle, the delivery target transportation method comprising:
- unwinding a linear member of the unmanned aerial vehicle by a winding machine of the unmanned aerial vehicle;
- upon receiving a predetermined signal, allowing supply of power from a battery to an electromagnet of an end portion of the linear member, to thereby generate a magnetic attraction force between the electromagnet and an attraction-responsive part that is ferromagnetic and provided to a delivery target; and
- holding the delivery target by a holding mechanism of the unmanned aerial vehicle, in a state in which the electromagnet and the attraction-responsive part are coupled to each other by the magnetic attraction force, the holding mechanism comprising at least one movable support.

17. A delivery target transportation method using an unmanned aerial vehicle, the delivery target transportation method comprising:
- unwinding a linear member of the unmanned aerial vehicle by a winding machine of the unmanned aerial vehicle;
- generating a magnetic attraction force between an attractive member of an end portion of the linear member and an attraction-responsive part that is ferromagnetic and provided to a delivery target;
- detecting a coupling state between the attractive member and the attraction-responsive part by a coupling detection unit comprising at least one of a photoelectric sensor, a limit switch, and a magnetic field sensor; and
- holding the delivery target by a holding mechanism of the unmanned aerial vehicle, the holding mechanism comprising at least one movable support, the holding mechanism being configured to begin to hold the delivery target in response to detection of coupling by the coupling detection unit.

* * * * *